May 16, 1967
O. J. OTT
3,320,434
GENERATOR PRODUCING CONTROLLED-AREA OUTPUT-PULSES ONLY
WHEN CAPACITOR CHARGES BETWEEN POSITIVE AND
NEGATIVE CLAMPS IN RESPONSE TO A.C. INPUT
Filed Jan. 9, 1964
3 Sheets-Sheet 3
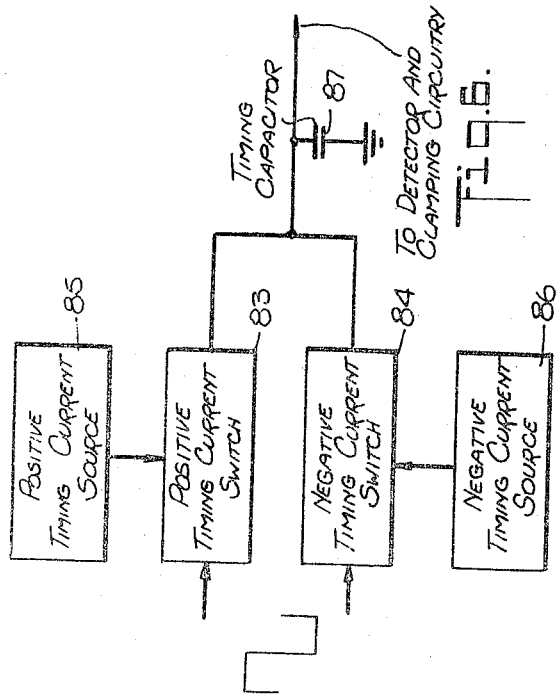
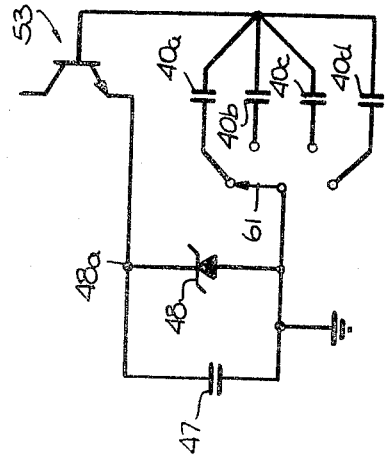
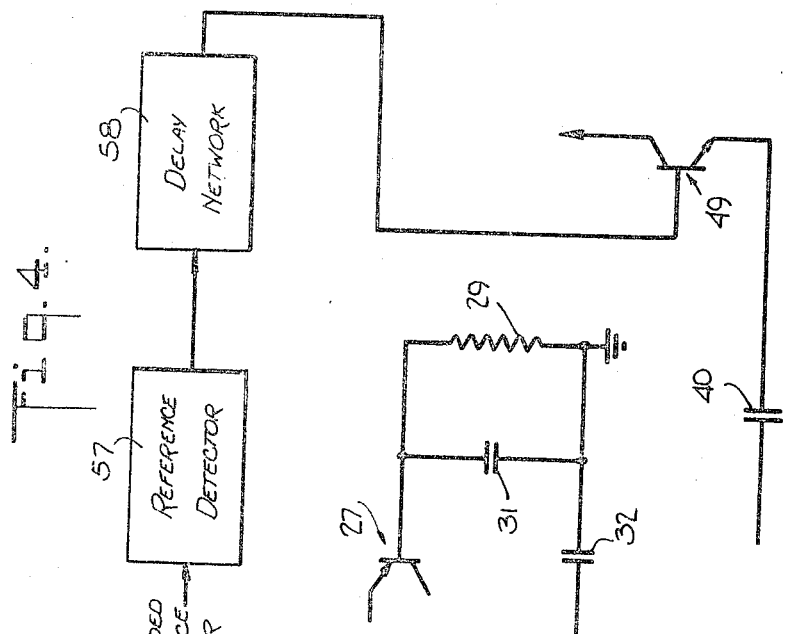
INVENTOR.
OWEN J. OTT
BY
Kenyon &Kenyon
ATTORNEYS United States Patent Office
3,320,434
Patented May 16, 1967

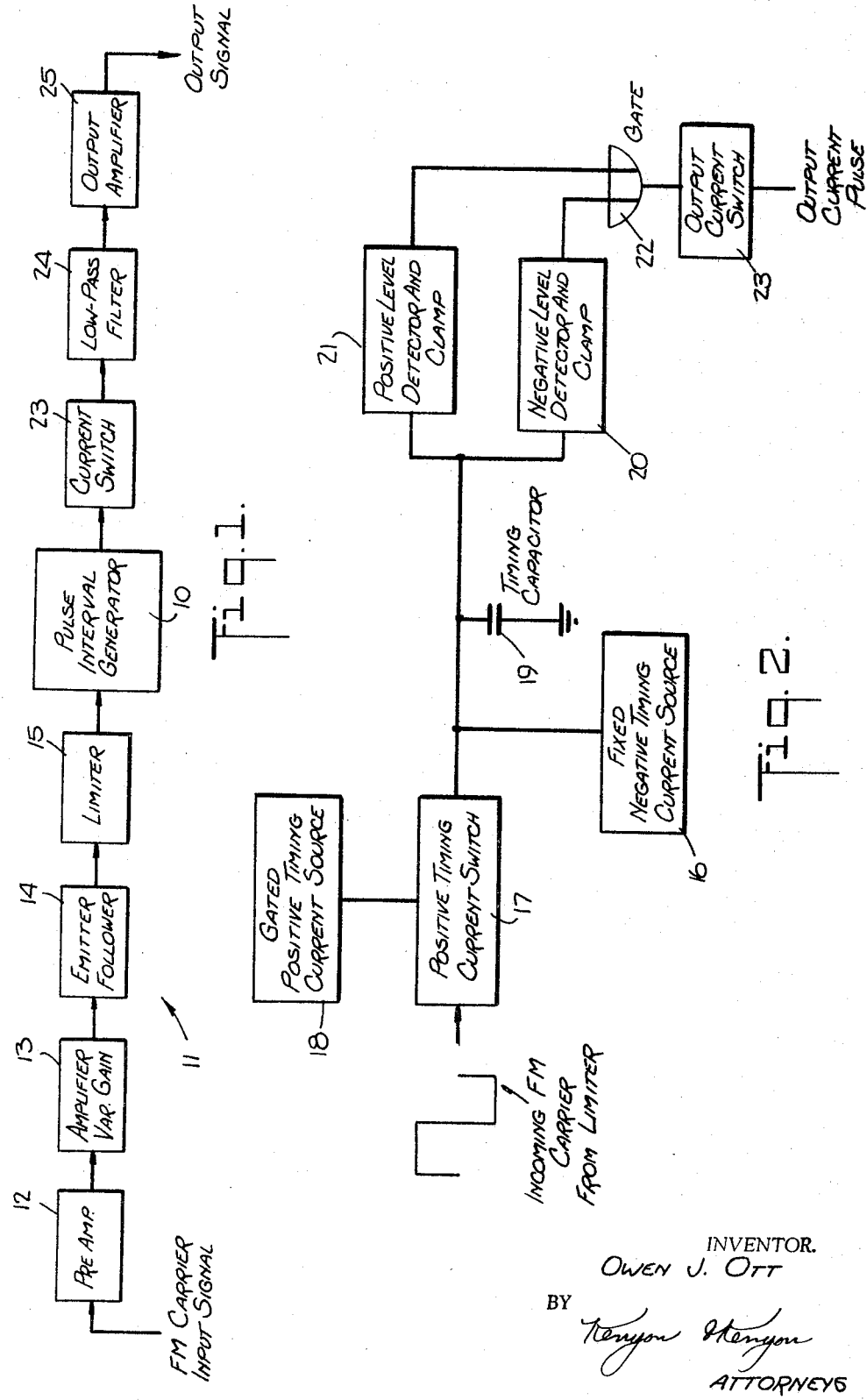

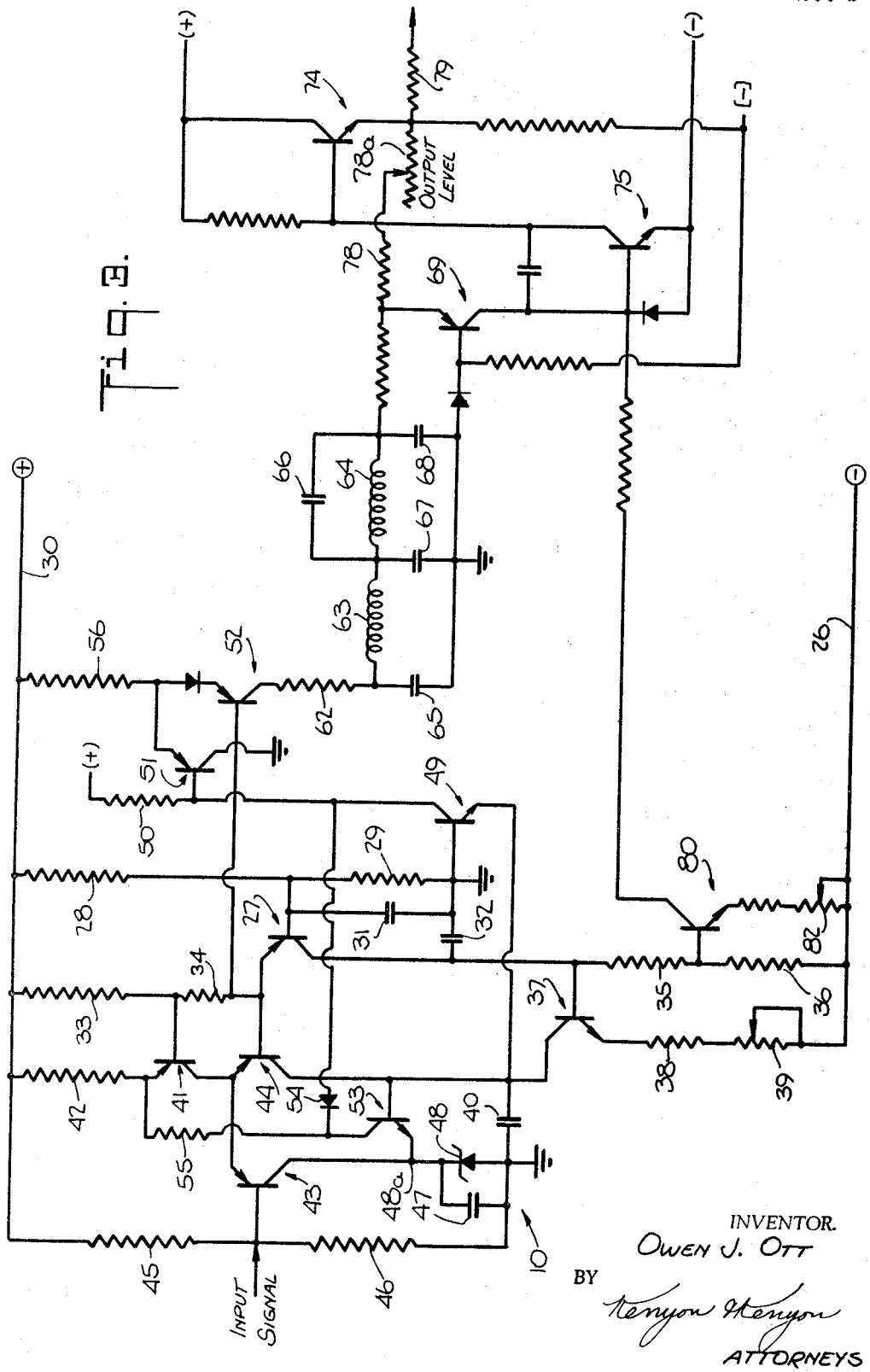

3,320,434
GENERATOR PRODUCING CONTROLLED-AREA OUTPUT-PULSES ONLY WHEN CAPACITOR CHARGES BETWEEN POSITIVE AND NEGATIVE CLAMPS IN RESPONSE TO A.C. INPUT
Owen J. Ott, Brookfield, Conn., assignor to Data-Control Systems, Inc., Danbury, Conn., a corporation of Delaware
Filed Jan. 9, 1964, Ser. No. 336,773
11 Claims. (Cl. 307—88.5)

This invention relates to a circuit for generating controlled area pulses and more in particular to a circuit generating pulses to be employed in the demodulating of a frequency modulated carrier.

In the past it has been common practice in pulse generating devices to employ a timing capacitor for establishing the timing interval of the pulses. In many of these devices, such as monostable multivibrators, the charge placed on the timing capacitor during the timing interval for a pulse must be completely removed subsequent to the formation of the pulse. The necessity of removing the charge from the timing capacitor can prevent or interfere with the generation of pulses with good accuracy when operating at high repetition rates or for long-duty cycles.

In demodulating a frequency modulated carrier, it is desirable to generate controlled area pulses upon each axis crossing of the incoming FM carrier. In such an application it is especially important that the pulses generated at each axis crossing of the carrier have a well-defined duration regardless of the repetition rate or duty cycle since the pulses are averaged in deriving the intelligence component from the FM carrier.

It is therefore one of the objects of the invention to provide a pulse-generating circuit to generate pulses having a well-defined time duration for both high repetition rates and long-duty cycles.

It is another object of the invention to provide a pulse-generating circuit for generating controlled area pulses in response to an FM carrier.

It is still another object of the invention to provide a pulse-generating circuit in which the need to discharge the timing capacitor abruptly at any point during a cycle is eliminated.

It is an additional object of the invention to provide a pulse-generating circuit in which the pulse duration is responsive to the charging of the timing capacitor from one level to another level of charge.

It is another additional object of the invention to provide a pulse-generating circuit in which the duration of the pulse is responsive to the time at which the timing capacitor is maintained at at least one level of charge thereof.

It is a further object of the invention to provide a demodulator in which the timing capacitor for the generation of pulses therein is in a state of charge throughout the cycle of operation of the demodulator.

It is also an object of the invention to compensate the pulse-generating circuit of a demodulator when demodulating an FM carrier recorded on tape in order to prevent any apparent changes in the width of the pulses generated which are caused by tape speed variations.

In one embodiment of the invention the pulse-generating circuit comprises capacitance means with means for supplying a predetermined current to charge the capacitance means. The circuit also includes additional means for supplying another predetermined current to charge the capacitance means. Means responsive to the charging of the capacitance means by the predetermined current are provided for clamping the capacitance means at a predetermined level of charge. Additional means responsive to the charging of the capacitance means by the additional current are provided for clamping the capacitance means at another predetermined level of charge. The circuit further includes means for producing an output pulse in response to at least one of the conditions of charge of the capacitance means from the predetermined level of charge to the other predetermined level of charge.

In another embodiment of the invention the means for producing the output pulse is responsive to the transition of the capacitance means between a predetermined level of charge and another predetermined level of charge.

In still another embodiment of the invention there is included means for supplying a predetermined current from a source of one polarity to charge the capacitance means. There also is provided additional means for supplying a predetermined current from a source of the opposite polarity to charge the capacitance means. With this arrangement, one of the charging currents for the capacitance means is equal to a current corresponding to the difference current of the current supplying means and the additional current supplying means.

In any additional embodiment of the invention the means for producing the output pulse is responsive to the clamping of the capacitance means at at least one of the predetermined levels of charge and the other predetermined level of charge.

In a further embodiment of the invention each different charging of the timing capacitor is responsive to an FM carrier during the demodulation of the carrier.

In still a further embodiment of the invention the means for producing the output pulse in demodulating a tape recorded signal is controlled to compensate for tape speed changes.

For a more complete understanding of the present invention reference should be had to the following specification and to the appended drawings, of which:

FIG. 1 is a block diagram showing a demodulator in which the pulse generator of the invention can be employed;

FIG. 2 is a block diagram of the pulse generator of the invention;

FIG. 3 is a schematic representation of the pulse generator of the invention;

FIG. 4 is a block diagram and a fragmentary schematic representation of a modification for providing compensation to the pulse generator of the invention;

FIG. 5 is a fragmentary schematic representation of a switching arrangement for a plurality of timing capacitors; and FIG. 6 is a fragmentary block diagram of another embodiment of the circuit for switching the charging currents for the timing capacitor.

Pulse generator 10 of the invention can be used in demodulator 11 shown in the block diagram of FIG. 1. By way of example, demodulator 11 can be used in conjunction with a magnetic tape recorder for demodulating the playback of a tape upon which is recorded an FM carrier in order to detect the high frequency wide band subcarrier signal. Demodulator 11 is a pulse-averaging type demodulator having superior linearity and low distortion. The FM carrier from the reproduced amplifier of a magnetic tape recorder device (not shown) is applied as an input signal to pre-amplifier 12 where it is amplified. Subsequently the output of the preamplifier is increased in level by variable gain amplifier 13. After buffering by emitter follower 14, the amplified FM carrier is fed to limiter 15, from which the carrier emerges as a steep-sided square wave.

The function of pulse generating circuit or pulse generator 10 is to form equal area pulses for each axis crossing of the steep-sided square wave emerging from limiter 15. As shown in the block diagram of FIG. 2, pulse generator 10 includes means for supplying a predetermined current, that is, fixed negative current source 16, and additional means for supplying another predetermined current, that is, gated positive current source 17, which is actuated by the incoming FM carrier from limiter 15. Where symmetrical pulses are to be generated by the pulse generator, gated positive timing source 18, a source of one polarity, provides a current having a value equal to twice the current from negative timing current source 16, a source of the opposite polarity. With this arrangement, whenever gated current source 18 is cut off by the incoming carrier by means for selectively connecting the additional current-supplying means, such as positive timing current switch 17, the capacitance means of the pulse generator or timing capacitor 19 is charged in a negative sense at a rate determined by the value of the timing capacitor and the value of negative current source 16.

The time interval produced by the circuit related to timing capacitor 19 is determined by its charging rate and in addition by means for clamping the capacitance means at one predetermined level of charge, that is, the threshold lepel of negative level detector and clamp 20. During the time that neither negative level detector and clamp 20 nor the additional means for clamping the capacitance means at another predetermined level of charge, namely, positive level detector and clamp 21 are activated, that is to say, during the time when the timing capacitor 19 is being charged from one level of charge to the other gate 22 does not inhibit output current switch 23 so that an output current pulse is produced. The magnitude of the output current pulse is determined by output current switch 23 which together with gate 22 comprises means for producing an output pulse in response to at least one of the conditions of charge of the timing capacitor. The duration of the output current pulse is determined by timing capacitor 19, timing current sources 16 and 18, and the level detector thresholds of detectors and clamps 20 and 21. With respect to determining the magnitude of the output current pulse, it should be understood that the various elements of the pulse generator may be independently controlled.

When the positive timing current switch 17 is enabled by a positive changing portion of the incoming carrier, a current greater than, for example, twice the magnitude of the negative timing current from fixed negative timing current source 16 is fed by switch 17 from gated positive timing current source 18 to timing capacitor 19. The positive current from source 18 causes capacitor 19 to charge in the positive sense until the activating threshold of positive level detector and clamp 21 is reached. In response to reaching the threshold level, gate 22 shuts off output current switch 23 and terminates the output current pulse. With this arrangement it can be understood that the output current pulses are delivered during the interval when timing capacitor 19 is being driven from either clamped charge level to the other. By way of modification, output current switch 23 can be adapted to produce an output during the time that the timing capacitor 19 is in either of its clamped positions, instead of producing an output when the timing capacitor is being driven from one clamped position of charge level to the other.

In pulse generator 10, timing capacitor 19 is charged by current from a source of one polarity and subsequently charged by current from a source of the opposite polarity as opposed to the conventional use of the timing capacitor by which it is charged and subsequently allowed to be discharged in the formation of a pulse. Thus since there is no necessity to discharge the timing capacitor between the generation of pulses, the pulse duty cycle can approach 100% without interaction between successive pulses and the duty cycle of pulses produced by the positive and negative input transitions can thereby be simultaneously controlled by the use of a single timing capacitor. In place of the difference current charging arrangement for timing capacitor 19, independent current sources of opposite sense can be provided for the successive chargings of the timing capacitor.

The output current from output current switch 23 is a pulse train having double the frequency of the incoming FM carrier. As shown in FIG. 1 from output current switch 23, the output current pulses are applied to low-pass filter 24 where the average value of the equal area pulses is derived in order to detect the intelligence of the FM carrier. An increase in the frequency of the incoming carrier increases the number of fixed area pulses per unit time and thereby results in an increase in the output signal from low-pass filter 24. The output emerging from low-pass filter 24 is amplified by output amplifier 25 in order to produce the demodulator output signal.

An embodiment of the pulse generator of the invention is shown in FIG. 3. The portion of the circuit comprising fixed negative timing current source 16 (FIG. 2) extends from line 26 which is connected to the negative power source (FIG. 3). Transistor 27 has its base connected to the common junction of resistors 28 and 29. The resistors are connected between line 30, which is connected to the positive power source and the ground connection. Capacitor 31, which is connected in shunt with resistor 29, and capacitor 32 connected from the ground connection to the collector of transistor 27 provide suppression of noise voltages which might otherwise appear at the base or collector electrodes of transistor 27.

The collector emitter circuit of transistor 27 provides a constant current to the series circuit extending from line 30 to line 26 and including resistor 33, resistor 34, resistor 35 and resistor 36. Resistors 35 and 36 serve as two portions of a voltage divider network to which is applied a constant current. With the constant current condition the voltage drop across each of resistors 35 and 36 remains a constant, regardless of variations in the voltage of the negative power source. The constant voltage drop resulting from the constant current applied in series to resistors 35 and 36 results in a fixed bias being applied between the base of transistor 37 and the negative power source 26. In view of this, the collector current of transistor 37 passing through resistor 38 and Balance potentiometer 39 remains substantially constant in spite of voltage variations of the negative power source at line 26. In this way transistor 37 serves as a high impedance fixed negative timing current source for timing capacitor 40 connected at one side to the collector of transistor 37 and at the other side to ground.

Gated positive timing current source 18 of FIG. 2 is provided by transistor 41 having its emitter connected to resistor 42 extending from line 30 which is connected to the positive power supply. The function of positive timing current switch 17 of FIG. 2 is served by transistors 43 and 44 (FIG. 3). The FM carrier signal emerging from limiter 15 is applied to pulse generator 10 at the common junctions of resistors 45 and 46 and the base of transistor 43. Resistors 45 and 46 bias the base of transistor 43 to a voltage substantially equal to the voltage at the base of transistor 44. When the base of transistor 43 is driven negative with respect to its emitter by the input signal, the positive timing collector current of transistor 41 is diverted by transistor 43 to zener diode 48 which is shunted by capacitor 47. The current passing through zener diode 48 in the breakdown direction to ground results in timing capacitor being charged only by the current from transistor 37. Thus by channeling the current from transistor 43 to zener diode 48, the timing capacitor is driven in the negative sense.

When the input signal from the limiter to the base of transistor 43 changes in the positive direction, transistor 43 is cut off and causes the current from transistor 41 to be conducted through transistor 44 to timing capacitor 40. This current which is greater in magnitude (for example twice) than the current from transistor 37 opposes the current supplied to the timing capacitor by transistor 37 and charges the capacitor in the positive sense. Thus it can be seen that when the base of transistor 43 is driven negative, the current from transistor 41 is diverted from the timing capacitor and it is charged in the negative direction, but when the base of transistor 43 is driven positive, the current from transistor 41 is channeled into the timing capacitor and it is driven positive.

By way of example, transistor 37 can be conditioned to supply a fixed negative current of approximately 6 milliamps. The current supplied by transistor 41 on the other hand can be conditioned to be about 12 milliamps in the positive direction. Consequently when a negative signal is applied to the base of transistor 43, the negative 6 milliamps from transistor 37 drives the timing capacitor in a negative direction. Upon the applying of a positive signal to the base of transistor 43, the timing capacitor is subjected to positive 12 milliamps minus negative 6 milliamps, with the result that the timing capacitor is driven positive by a current of positive 6 milliamps.

During the negative excursion of the limiter signal applied to the pulse generator, transistor 43 conducts thereby diverting current from transistor 41 to zener diode 48 and cutting off transistor 44. This allows timing capacitor 40 to swing into negative sense in response to the current from transistor 37 until its voltage becomes slightly negative. At this point transistor 49 conducts, clamping the timing capacitor at the negative voltage for the remaining part of the half cycle.

When the timing capacitor which is connected to the emitter of NPN transistor 49 is charged in the negative direction, transistor 49 is turned on and thereby serves to clamp the timing capacitor voltage nearby to ground by transferring the negative charging current from transistor 37 to a switching circuit comprising resistor 50, transistor 51 and transistor 52. The negative charging current shunts off the current from transistor 52 to low pass filter 24 and output amplifier 25.

When the input signal excursion from the limiter is positive, it cuts off transistor 43 and diverts the positive timing current from transitsor 41 through transistor 44 to timing capacitor 40. When the timing capacitor is charged more positive then zener diode 48 at the connection 48a thereof with the collector of transistor 43 and the emitter of transistor 53, transistor 53 conducts and the resulting negative excursion of the collector of transistor 53 shuts off the current switching circuit including resistor 50, transistor 51, and transistor 52, thereby disconnecting the current from the output circuitry. The negative excursion is transferred to the base of transistor 51 at resistor 50 by means of diode 54 extending from the collector of transistor 53 and connected to resistor 55 leading to the emitter of transistor 41. When transistor 53 conducts, it clamps timing capacitor 40 to nearly the voltage of junction 48a at zener diode 48 by subtracting excess current from the emitter of the current source of transistor 41. When transistor 53 clamps timing capacitor 40 on the positive level the collector voltage of transistor 53 drops to a level which is necessary to pull the charging current for the timing capacitor from the emitter of transistor 41 through resistor 42. This voltage is transferred to resistor 50 by way of diode 54. Thus the base of transistor 51 is pulled to an increased negative voltage during the time that timing capacitor 40 is clamped at the positive level.

In a clamped condition, the charging current from transistor 37 flows through transistor 49 causing the voltage of the base of transistor 51 to be reduced. Consequently, transistor 51 conducts whenever the timing capacitor is clamped at either the positive or negative level of charge, but during the interval in which the timing capacitor is in a state of transition, the base of transistor 51 rises to a maximum voltage and current flows through transistor 52 by way of resistor 56 to low pass filter 24.

If during operation of the pulse generating circuit, transistor 53 is allowed to be saturated by the charging current flowing through it, transistor 53 can operate with a long recovery time period which would make the circuit unsuitable for high frequency applications. The feedback loop from transistor 53 to transistor 41 by way of resistor 55 controls the base-to-collector bias in a manner which prevents saturation of transistor 53. Transistor 49 is protected from saturation by means of the voltage restriction imposed by resistor 50.

In using the pulse generator of the invention in a system for the demodulation of an FM carrier recorded on magnetic tape, such as the arrangement shown in FIG. 1, variations in the speed of the tape transport mechanism can introduce an additional apparent frequency modulation. In such a circumstance, compensation for the tape speed variations may be required. Without compensation the speed variations are detected and appear as an erroneous signal with the output signal since the speed changes vary the pulse rate during demodulation and consequently give an error in the averaged output signal.

As shown in FIG. 4, tape speed reference detector 57 demodulates a pre-recorded reference carrier in order to provide a D.C. signal proportional to the tape speed error. By means of delay network 58, the D.C. signal is delayed an amount equal to the delay in the demodulator to be compensated and then is applied as a control signal to the base of transistor 49, which is grounded when tape speed error compensation is not employed (FIG. 3). Varying the base voltage of transistor 49 in accordance with the D.C. signal proportional to tape speed error changes the voltage excursion of timing capacitor 40, thereby adjusting the output pulse width. Thus proper adjustment of the control signal amplitude permits cancellation of errors produced by tape speed fluctuation.

In another embodiment of tape speed compensation, where it is desired to modulate the pulse width in order to compensate the tape speed variations, the compensating signal from control circuit 60 may be applied to connection 48a at the emitter of transistor 53 and capacitor 47 in place of the voltage level maintained by zener diode 48.

Where the circuit is to be used with tape equipment which is to be operated at a number of tape speeds, it is necessary to vary the value of timing capacitor 40. This can be done, as shown in FIG. 5, by the provision of a plurality of timing capacitors 40a–40d, each having a different value for each of the different tape speeds to be employed. Selector switch 61 enables the correct timing capacitor 40a–40d to be introduced into the pulse generating circuit for each given tape speed. By connecting switch 61 to the ground side of the circuit, the effect of the switch capacitance is held to a minimum. Switch 61 can be either a mechanical switch or an electronic switching circuit.

When the pulse generator is employed in demodulator 11, the output of the pulse generator appearing at the collector of transistor 52 is connected by means of resistor 62 to low pass filter 24 (FIG. 1). The low pass filter as shown in FIG. 3 includes a network of inductances 63 and 64 and capacitors 65, 66, 67 and 68. Since an increase in input frequency increases the number of fixed area pulses per second, there is a corresponding increase in the output of the low pass filter. Similarly there is a decrease in the output accompanying a decrease in the input frequency.

The output of the low pass filter is applied to output amplifier 25 (FIG. 1) which consist of common base transistor 69, common emitter transistor 75, and emitter follower output stage 74 (FIG. 3). Linearity and drift stability are achieved by means of feedback through Gain Control 78a and feedback resistor 78 from the emitter of transistor 74 to the emitter of transistor 69. Zero adjustment of the output voltage to the center frequency of the incoming carrier is made by varying Zero Control rheostat 82 in the emitter circuit of the bias current source for transistor 80. Since the amplifier shown is of the polarity reversing type, the output signal at resistor 79 is negative for increasing frequency.

Balance control 39 enables the output pulse widths for positive and negative excursions of the carrier to be equalized.

In a further embodiment of the invention, as shown in FIG. 6 the incoming FM carrier from the limiter is applied to positive and negative timing current switches 83 and 84, respectively, each being responsive to a positive and negative input excursion, respectively. Each of the timing current switches successively gate the current source connected thereto, that is, one of positive timing current source 85 and negative timing current source 86. With this arrangement as opposed to the use of a difference current the charging of timing capacitor 87 and the pulse width generated in response thereto by positive and negative input excursions can be independently controlled. Such a provision in many cases is not necessary in a demodulator circuit.

While the invention has been described in its preferred embodiments it is to be understood that the words which have been used are words of description rather than words of limitation and that changes within the purview of the appended claims may be made without departing from the true scope and spirit of the invention.

What is claimed:

1. A pulse generating circuit having a predetermined operating cycle comprising an input portion for receiving an input signal of varying sense, capacitance means, a plurality of sources of charges of different sense, means connected to said input portion and in circuit with one of said plurality of sources for charging said capacitance means in a predetermined sense in one portion of said operating cycle during which the charge of said capacitance means is changed, said charging means being actuated in response to an excursion of the input signal in one sense, additional means connected to said input portion and in circuit with at least another one of said plurality of sources for charging said capacitance means in a sense opposite to said predetermined sense in the other portion of said operating cycle during which the charge of said capacitance means is changed, said additional charging means being actuated in response to an excursion of the input signal in the opposite sense, and means for producing an output pulse in response to at least one of the conditions of charge of said capacitance means during said operating cycle.

2. A pulse generating circuit comprising an input portion for receiving an input signal of varying sense, timing capacitance means, a plurality of sources of charges of different levels, means connected to said input portion and in circuit with one of said plurality of sources for charging said capacitance means from one predetermined level of charge to another predetermined level of charge, said charging means being actuated in response to an excursion of the input signal in one sense, additional means connected to said input portion and in circuit with at least another one of said plurality of sources for charging said capacitance means from said other predetermined level to said predetermined level, said additional charging means being actuated in response to an excursion of the input signal in the opposite sense, and means for producing an output pulse in response to at least one of the conditions of charge of said capacitance means from said predetermined level to said other predetermined level, whereby said capacitance means is charged by one of said charging and additional charging means whenever the charge of said capacitance means is changed between said level and said predetermined level.

3. A pulse generating circuit comprising an input portion for receiving an input signal of varying sense, a plurality of capacitance means, means for connecting one side of each of said plurality of capacitance means to a source having a predetermined voltage, means connected to said input portion for charging said capacitance means from one predetermined level of charge to another predetermined level of charge, said charging means being actuated in response to an excursion of the input signal in one sense, additional means connected to said input portion for charging said capacitance means from said other predetermined level to said predetermined level, said additional charging means being actuated in response to an excursion of the input signal in the opposite sense, means for selectively connecting the other side of at least one of said plurality of capacitance means to said charging and said additional charging means, and means for producing an output pulse in response to at least one of the conditions of charge of said capacitance means from said predetermined level to said other predetermined level, whereby said capacitance means is charged by one of said charging and additional charging means whenever the charge of said capacitance means is changed between said level and said predetermined level.

4. A pulse generating circuit comprising capacitance means, means connected to said capacitance means for supplying a predetermined current thereto from a source of one polarity to charge said capacitance means, additional charging means for supplying another predetermined current from a source of the opposite polarity, means for selectively connecting said additional current supplying means to said capacitance means to charge said capacitance means by a current equal to the difference of said predetermined current and said other predetermined current, means responsive to the charging of said capacitance means by the predetermined current of said current supplying means for clamping said capacitance means at a predetermined level of charge, additional means responsive to the charging of said capacitance means by the difference current of said current supplying means and said additional current supplying means for clamping said capacitance means at another predetermined level of charge, and means for producing an output pulse in response to at least one of the conditions of charge of said capacitance means from said predetermined level of charge to said other predetermined level of charge.

5. A circuit for generating pulses in response to an input signal comprising capacitance means, means connected to said capacitance means for supplying a predetermined current thereto from a source of one polarity to charge said capacitance means, additional means for supplying another predetermined current from a source of the opposite polarity, means responsive to the charge of an input signal in at least one sense for selectively connecting said additional current supplying means to said capacitance means to charge said capacitance means by a current equal to the difference of said predetermined current and said other predetermined current, means responsive to the charging of said capacitance means by the predetermined current of said current supplying means for clamping said capacitance means at a predetermined level of charge, additional means responsive to the charging of said capacitance means by the difference current of said current supplying means and said additional current supplying means for clamping said capacitance means at another predetermined level of charge, and means for producing an output pulse in response to at least one of the conditions of charge of said capacitance means from said predetermined level of charge to said other predetermined level of charge.

6. A pulse generating circuit to be driven in response to the excursions of an input signal comprising timing capacitance means, means connected to said capacitance means for supplying a predetermined current from a source of one polarity to said capacitance means, additional means for supplying another predetermined current from a source of the opposite polarity to said capacitance means, means for selectively connecting said additional means to said capacitance means in response to excursions of said input signal in at least one sense, means responsive to the charging of said capacitance means by said current supplying means for clamping said capacitance means at a predetermined level of charge, additional means responsive to the charging of said capacitance means by said additional current supplying means for clamping said capacitance means at another predetermined level of charge, and means for producing an output pulse having a duration responsive to at least one of the conditions of charge of said capacitance means from said predetermined level to said other predetermined level of charge.

7. A pulse generating circuit comprising capacitance means, a first transistor connected to said capacitance means for supplying a predetermined current from a source of one polarity to said capacitance means, a second transistor for supplying another predetermined current from a source of the opposite polarity to said capacitance means, a third transistor for selectively connecting said second transistor to said capacitance means, a fourth transistor connected to said capacitance means and responsive to the charging of said capacitance means by said first transistor for clamping said capacitance means at a predetermined level of charge, a fifth transistor connected to said capacitance means and responsive to the charging of said capacitance means by said second transistor for clamping said capacitance means at another predetermined level of charge, and means for producing an output pulse in response to at least one of the conditions of charge of said capacitance means from said predetermined level to said other predetermined level of charge.

8. A pulse generating circuit to be driven in response to the excursions of an input signal comprising timing capacitance means, a first transistor connected to said capacitance means for supplying a predetermined current from a source of one polarity to said capacitance means, a second transistor for supplying another predetermined current from a source of the opposite polarity to said capacitance means, a third transistor for switching said second transistor to said capacitance means in response to excursions of said input signal in at least one sense, a fourth transistor connected to said capacitance means and responsive to the charging of said capacitance means by said first transistor for clamping said capacitance means at a predetermined level of charge, a fifth transistor connected to said capacitance means and responsive to the charging of said capacitance means by said second transistor for clamping said capacitance means at another predetermined level of charge, and means for producing an output pulse having a duration in response to at least one of the conditions of charge of said capacitance means from said predetermined level of charge to said other predetermined level of charge.

9. A pulse generating circuit adapted to be responsive to the excursions of an input signal comprising timing capacitance means, a first transistor having its collector in circuit with said capacitance means for supplying a predetermined current from a source of one polarity to said capacitance means, a second transistor having its collector in circuit with said capacitance means for supplying another predetermined current from a source of the opposite polarity to said capacitance means, a third transistor adapted to be actuated in response to the excursions of said input signal in at least one sense for switching said second transistor in circuit with said capacitance means, a fourth transistor having its base-to-emitter circuit connected to said capacitance means and being responsive to the charging of said capacitance means by said first transistor for clamping said capacitance means at a predetermined level of charge, a fifth transistor having its base-to-emitter circuit connected to said capacitance means and being responsive to the charging of said capacitance means by said second transistor for clamping said capacitance means at another predetermined level of charge, and means for producing an output pulse having a duration in response to the condition of charge of said capacitance means from said predetermined level to said other predetermined level of charge.

10. A demodulator circuit for a frequency modulated carrier input signal comprising a pulse generating circuit including capacitance means, means for supplying a predetermined current from a source of one polarity to charge said capacitance means, additional means for supplying another predetermined current from a source of the opposite polarity to charge said capacitance means, means responsive to said input signal in one sense for impressing said current supplying means on said capacitance means, means responsive to said input signal in the other sense for impressing said additional current supplying means on said capacitance means, means responsive to the charging of said capacitance means by the predetermined current of said current supplying means for clamping said capacitance means at a predetermined level of charge, additional means responsive to the charging of said capacitance means by the other predetermined current of said additional current supplying means for clamping said capacitance means at another predetermined level of charge, means for producing an output pulse in response to at least one of the conditions of charge of said capacitance means from said predetermined level of charge to said other predetermined level of charge; and means for filtering the carrier frequency from said output pulse to detect the modulation of said carrier.

11. A demodulator circuit for a frequency modulated carrier input signal derived from a recording media operating at a predetermined speed comprising a pulse generating circuit including timing capacitance means, means for supplying a predetermined current from a source of one polarity to charge said capacitance means, additional means for supplying another predetermined current from a source of the opposite polarity to charge said capacitance means, means responsive to said input signal in one sense for impressing said current supplying means on said capacitance means, means responsive to said input signal in the other sense for impressing said additional current supplying means on said capacitance means, means responsive to the charging of said capacitance means by the predetermined current of said current supplying means for clamping said capacitance means at a predetermined level of charge, additional means responsive to the charging of said capacitance means by the other predetermined current of said additional current supplying means for clamping said capacitance means at another predetermined level of charge, means for producing an output pulse in response to at least one of the conditions of charge of said capacitance means from said predetermined level of charge to said other predetermined level of charge; means for filtering the carrier frequency from said output pulse to detect the modulation of said carrier; and means responsive to a change from the predetermined speed of said recording media for varying the level of charge at which at least one of said clamping means and said additional clamping means operate, whereby the output pulse is compensated for the change in speed from the predetermined speed of the recording media.

References Cited by the Examiner

UNITED STATES PATENTS

| | | | |
|---|---|---|---|
| 2,797,327 | 6/1957 | Kidd | 307—88.5 |
| 2,845,548 | 7/1958 | Sillman et al. | 307—88.5 |
| 3,007,055 | 10/1961 | Herzfeld | 307—88.5 |
| 3,032,714 | 5/1962 | Cohen | 320—1 |
| 3,049,625 | 8/1962 | Brockman | 307—88.5 |
| 3,064,144 | 11/1962 | Hardy | 307—88.5 |
| 3,168,658 | 6/1965 | Marshall | 307—88.5 |

ARTHUR GAUSS, *Primary Examiner.*

J. HEYMAN, *Assistant Examiner.*